April 27, 1937.                M. ARENDT                2,078,362
GAS ELECTRIC VEHICLE
Original Filed Oct. 17, 1921
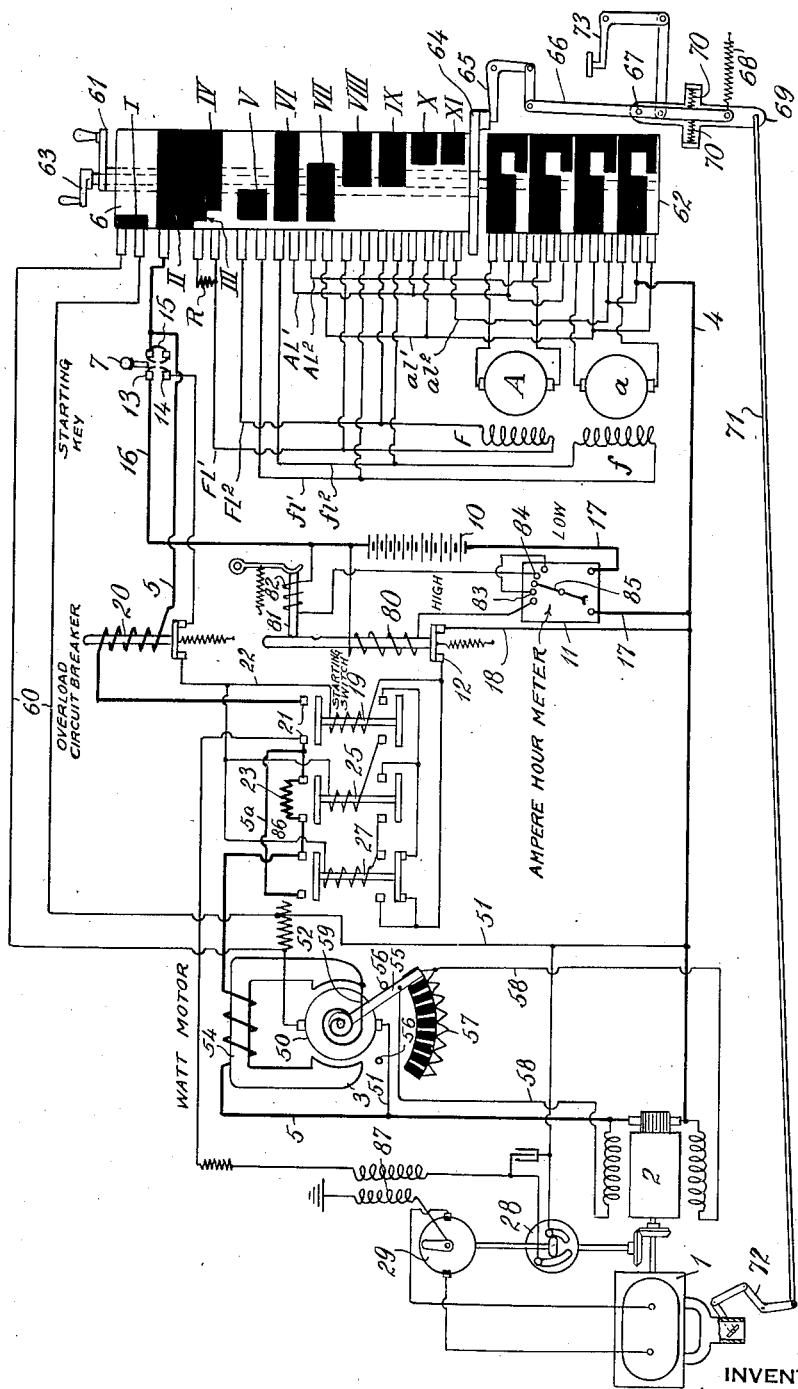
INVENTOR
BY
ATTORNEYS Patented Apr. 27, 1937

2,078,362

UNITED STATES PATENT OFFICE 2,078,362

GAS ELECTRIC VEHICLE

Morton Arendt, New York, N. Y.

Continuation of application Serial No. 508,191, October 17, 1921. This application December 17, 1929, Serial No. 414,776. Renewed August 21, 1936

4 Claims. (Cl. 290—17)

This invention relates to self-charging electric vehicles of the type in which the electric power which drives the vehicle is derived from a generator driven by an internal combustion engine or other suitable prime mover carried by the vehicle and delivering its output in part to the driving motor or motors of the vehicle and in part to a storage battery, which latter in turn supplies current to the driving motors when the power demands of the vehicle exceed the generator output. The invention of this application is an improvement on the invention disclosed in application Ser. No. 397,076, filed jointly by myself and W. B. Morton on July 17, 1920.

This application is a continuation of my earlier filed application Ser. No. 508,191, filed October 17, 1921. This application is also a continuation in part of my prior application Ser. No. 659,300, filed August 25, 1923 (now U. S. Patent No. 1,790,634, granted January 27, 1931).

In these prior applications there is disclosed as one feature of the invention a so-called "watt motor" whereby the field characteristics of the generator are altered with changes in load on the driving motors of the system to thereby maintain a substantially constant watt output of the generator. By this arrangement the fall in voltage incidental to the high rate of discharge of the battery on heavy loads is in a measure compensated for by the increased current output of the generator. This feature of the invention of my application Ser. No. 508,191 is claimed in my later application Ser. No. 659,300 and this application is filed to protect such features of the invention of my earlier application as are not described and claimed in the later filed set of applications.

In systems of this kind when applied to the propulsion of motor vehicles it is essential that the weight of the engine, generator and battery be reduced to the minimum possible which will operate the vehicle in the manner desired. The generator and engine must have a capacity such that their continuous operation at maximum output over a period of operation will generate the total amount of power required for the operation of the vehicle throughout that period. A capacity less than this will obviously involve drawing upon the battery for more power than is returned to the battery so that the vehicle cannot continue to operate unless the battery is charged from an external source of current. A generator and engine, however, of this capacity is much smaller than the engine and generator necessary to drive a vehicle of the so-called straight gas electric type wherein no battery is employed, for the reason that in that type of vehicle the engine and generator must have a capacity sufficient to supply the peak load requirements of the vehicle operation. It is a well known fact that the acceleration of a heavy vehicle involves an energy consumption several times greater than that required to operate the vehicle along a level highway. Hence if the power plant is of sufficient capacity to accelerate the vehicle at a rate necessary for modern traffic conditions, an engine is required of a size several times larger than necessary to supply the power required for operation over an extended period.

In a gas vehicle embodying a battery for supplying current for acceleration, heavy grades and other overload conditions, a very much smaller engine and generator can be used, but if a battery of large capacity is employed the advantage gained in reducing the size of the engine and generator is lost, and for that reason, although such systems of propulsion were proposed half a century ago, they have not yet come into any extended commercial operation.

In order to utilize a generator as small as possible it is essential that the generator be operated at full load at all times that this is possible, but when the battery is also of small capacity the battery is liable to be injured by a continuing of the charge after the battery is fully charged and also by being charged at too high a rate, as, for example, when the vehicle is stopped and no current is being consumed by the driving motors.

The overcharge of the battery can be guarded against by the employment of a stop-charge device, and in the apparatus disclosed in my original application Ser. No. 508,191 there is disclosed an ampere hour meter adapted to disconnect the generator and battery when the battery is fully charged, thereby preventing injurious overcharge should the current consumption over a more or less extended period be below the average. In order, however, to prevent an excessive drain of current from the battery should the operation of the stop-charge device be immediately followed by a condition of overload (as is often the case in vehicle operation where the overcharge is liable to take place when the vehicle is stopped in traffic, followed by overload from rapid acceleration) means are provided for starting the engine and generator as soon as a small amount of current is drawn from the battery. By this arrangement in the usual and expected operation of the vehicle the generator will be delivering its full output and the battery will be connected in the circuit so as to receive the surplus current unless conditions are such that that surplus would cause injury to the battery.

For preventing injury to the battery from an excessive rate of charge there is provided an engine and generator control for automatically reducing the generator output when the vehicle is stopped to thereby prevent the battery being charged at an excessive rate when the entire generator output is being taken by the battery.

The accompanying drawing illustrates my improvements diagrammatically.

Referring to the drawing, 1 indicates the internal combustion engine which may be a simple two-cylinder engine which, for a vehicle of five tons capacity, will produce about twelve or fifteen horse-power when operating at its speed of maximum efficiency. Directly driven from the motor 1 is a generator 2 governed by a control unit 3 constituting the so-called "watt motor", which is claimed in my co-pending application Ser. No. 659,300, but which is hereinafter described in some detail in order that the operation of the system may be fully understood. By the operation of this unit the generator maintains a constant power out-put regardless of variations in the voltage or currents, the current being supplied through the mains 4 and 5 and through the motor controller 6 to the driving motors A and a. I have illustrated two motors, but it is to be understood that one motor, driving the vehicle through a differential may be used. The storage battery 10 is connected to the mains 4 and 5 in parallel with the motors, the connections including the master switch or key 7, an ampere hour meter 11 installed between the main 4 and the battery 10 and an automatic switch 12, the operation of which will be later described.

In the drawing I have illustrated the connections from the circuit for driving the vehicle in heavy lines, and the connections which form part of the control only, such as the circuits of the starting devices and motor control circuits, in light lines. In starting the car the current from the battery is utilized to operate the generator 2 as a starting motor for the gas engine.

The system is controlled primarily from the master switch 7, here shown as a plug adapted when closed to connect three contacts 13, 14 and 15, respectively, contact 14 forming the terminal of the engine starting control circuit while contact 15 is connected to the main 5 between the generator and the motor through the speed controller 6, and the contact 13 constitutes the terminal of a conductor 16 leading to one pole of the battery. The other pole of the battery is connected through the ampere hour meter to the main 4 by a conductor 17. A line 18 leads from the main 4 to one terminal of the automatic switch 12, which line is connected through the switch to the coil of a starting switch 19, designed, when the coil is energized, to close a gap between two contacts 21 in the main 5 leading to the generator.

When the circuit is open at the plug 7, the switch 12 is held by its spring in position to close the connection between the lines 18 and the switch 19, the return line 22 from the switch 19 leading to the contact 14, but when the plug 7 closes the gap between contacts 13 and 14 a complete circuit is formed through the conductor 16, battery 10, lines 17 and 18, and the coil of the starting switch 19.

When the switch 19 closes the gap between the contacts 21 the circuit is completed through the battery 10, line 17, main 4, generator 2, main 5, contacts 15 and 12, and line 16 leading back to the battery, so that the battery will operate the generator as a motor, thereby turning the crankshaft of the engine 1. Upon initially closing the switch 19, the current passes through a resistance 23, which is cut out by automatic switch 25 in the usual manner, followed by the closing of switch 27 which completes a circuit through a shunt 5a around the resistances and remains closed so long as the generator is in operation. There may of course be only one starting switch or a plurality of successively operating resistances 23 and 15 switches 25 if desired.

A circuit breaker 20 of ordinary construction is installed in the line 22 with its coil energized through the main 5 so that the generator is cut out and the engine will be stopped upon excessive load coming on the generator. The ignition apparatus of the engine, here shown as comprising an interrupter 28 and distributor 29, is connected to the circuit through one of the contacts 21 to be energized upon the closing of the switch 19, so that as soon as the generator is started as a motor from the battery, the gas engine will be put in operation.

The "watt motor" comprises an armature 50 having a winding of many turns and a commutator in a shunt 51 across the brushes of the generator 2, or across the battery terminals as may be desired, the generator being an ordinary shunt wound generator. A resistance 52 which is adjustable in value is provided in the shunt circuit 51 in series with the armature of the watt-motor. Slight variations of this resistance produces a converse change in regulated output. A further purpose of resistance 52 will be described later. The field frame 54 of the watt motor has a winding of a few turns of heavy wire in series with the generator mains.

The shaft of the watt motor carries an arm 55 whose movement is limited by two stops 56 to a partial revolution commensurate in extent to the length of a series of contacts of a rheostat 57, the contacts being arranged to be successively engaged by a brush carried by the arm 55, so as to increase the resistance in the circuit 58 of the rheostat as the arm moves in the direction of rotation of the armature when the watt motor is energized by the current and voltage from the generator 2.

A spiral spring 59 is attached to the armature shaft, the spring tending to move the arm in the opposite direction to the movement produced by the current and voltage from the generator. The spring 59 is under an initial tension such as to produce a torque on the armature shaft equal to the torque produced by the watt motor when energized by a predetermined generator output of the desired value, the spring being designed so that its tension is not materially increased by the movement of the arm. The circuit 58 of the rheostat is connected in series with the field windings of the generator 2.

Conductors 61 lead from opposite ends of the resistance 52 to the motor controller 6 to be connected by a contact I when the controller handle is in the "stop" position in which the driving motors are disconnected from the circuit, thereby short-circuiting the resistance 52 in that position but connecting the resistance in the watt motor circuit in all positions of the controller in which the driving motors are energized, for a purpose to be later described.

The operation of the watt motor will now be described. The torque on the watt motor shaft is equal to the product of the current through the winding of the armature 50, which varies with the voltage across the brushes of the generator 2, and the flux across the field which varies with the current output of the generator. When the generator 2 is operating at its normal voltage, that is, when the generator output exceeds the demands of the driving motors and a portion of the current developed by the generator is charging the battery, the torque of the watt motor shaft will exceed the torque of the spring 59 and the arm 55 of the watt motor will be held in a position to maintain a portion of the resistance of the rheostat 51 in the circuit, thereby giving a predetermined value to the current and watt output of the generator. When, however, an excess load comes on the driving motors, requiring a considerable discharge from the battery, the potential difference across the mains 4 and 5 will fall, with the result that the output from the generator would decrease proportionately were it not compensated for by the action of the watt motor. However, the decrease in voltage across the terminals of the generator causes a decrease in torque of the armature of the watt motor, with the result that the coiled spring 59 tends to draw the rheostat arm toward the right as shown in the drawing (that is, counterclockwise) thereby reducing the resistance in the field of the generator with a corresponding increase in the current output at the same speed of operation. The increase in current output will exactly compensate for the decrease in voltage by reason of the fact that the winding of the field frame of the watt motor is in series with the main 5 and therefore the torque of the watt motor arm will be increased with the increase in current offsetting and balancing the action of the spring 59 when the rheostat arm reaches a position where the increase in current has offset the decrease in voltage.

As the speed of the gas engine at a fixed throttle position is directly proportional to the load on the engine shaft, the engine will operate at all times at a constant speed regardless of the position of the arm 55 of the rheostat. Hence, the engine will at all times operate at the speed of maximum efficiency.

By having a large number of coils to the rheostat the variation in load on the engine can be reduced to almost nothing. However, in practice such minute regulation is not essential and a rheostat allowing a variation in speed of 5% either way from the best speed of operation is not material.

The watt motor also prevents the generator becoming overloaded, thereby tending to stall the engine. If we assume the battery and generator working in parallel in driving the truck under more than normal load any increase in the load from a grade or road conditions will call for an increased current from the generator as well as from the battery. Such increased current, however, flowing through the main 5 will increase the torque of the watt motor shaft, thereby shifting the rheostat arm further to the left until the power output again balances the pull of the spring. By this system the extra load must always be taken by the battery, regardless of the cause of nature of the variation.

I have shown for the driver's control of the vehicle a standard controller such as now employed for electrically propelled vehicles, and have combined with it an engine control and a watt-motor control designed to prevent overcharging of the battery while the truck is standing still comprising the resistance 52 and controlling contacts described above. I have also shown two motors marked A and a with their fields and armatures so connected that the fields and armatures may both be connected in series by the first adjustment of the control handle and that thereafter as the control handle is turned the fields will be connected in parallel and the armatures in series and upon the final adjustment, the fields and armatures will both be in parallel, as is usual in this type of control.

I will not describe the motor control circuit in detail as I claim no particular novelty or advantage in the arrangement shown. The same purpose may be obtained by a single motor with double windings and in various other ways now in use. For convenience in reading the drawing, I have designated the leads from the field F of the motor A, $FL^1$ and $FL^2$ respectively, and the leads from the armature of the motor A, $AL^1$ and $AL^2$, respectively. I have also designated the leads from the field $f$ of the motor a, $fl^1$ and $fl^2$, respectively, and the leads from the armature of the motor a, $al^1$ and $al^2$, respectively.

The controller drum has eleven contact strips which I have indicated I–XI, inclusive. Contact I comprises a short segment which in the "stop" position of the controller illustrated in the drawing short circuits the resistance 52 in the line 51 to one brush of the watt motor armature. The purpose of this resistance is to cause a different setting of the watt motor arm when the motor is in operation.

This short segment moves off its contacts as soon as the regulator handle is turned to a position to start the vehicle. In the first starting position the current is delivered to the driving motors through the segments II and III of the controller drum so that the current passes through the starting resistance $R^1$ in the usual manner. In this position the armatures and fields of the driving motors are connected in series. Upon the adjustment of the control handle 61 to the next operating position the resistance $R^1$ will be cut out and upon further adjustment of the control handle the connections will be changed from series to parallel arrangement, as described.

I have also shown the controller as provided with an auxiliary drum 62 carrying reversing connections, the auxiliary drum being operated by the reversing handle 63 passing through the hollow shaft of the main drum 6. The reversing drum operates to reverse the direction of flow of current through the armatures of the motor and thereby reverse the direction of drive.

I have also shown the control drum as provided with an engine controlling mechanism whereby the throttle of the engine indicated diagrammatically at 72 will be partially closed when the controller arm is at the "stop" position. This mechanism comprises a cam 64 attached to the bottom end of the drum 6 and having an inclined cam on its lower face, which cam works against one arm of a bell crank 65 connected through a link to a lever 66 fulcrumed at 67, the free end of the lever 66 being held by a spring 68 in a direction to press the arm of the bell crank 65 against the cam.

Also carried by the pivot 67 of the lever 66 is an arm 69 which extends alongside the lower end of the lever 66 to a point below the end of the lever. The arm 69 is connected to the lower end of the lever 66 to move in synchronism with it under normal conditions by means of two springs 70 which lie on either side of the lever 66, their outer ends abutting against stops carried by the arm 69. By this arrangement the arm 69 may be operated independently of the lever 66 by applying to it a pressure exceeding the tension of the spring 70 but when free to move will move in synchronism with the lever. The lower end of the arm 69 is connected through a rod 71 with the bell crank 72 which controls the movement of the throttle, the arrangement being such that the movement of the lever 66 through the action of the cam 64 tends to close the throttle while the movement under the action of the spring 68 opens the throttle. The arm 69 may be independently operated by the driver through any suitable connection, for instance, the treadle lever 73, in the manner shown. No operation of the lever 73 is required in the normal working of the control system, but it is desirable to provide this independent control so that in case of any breakdown of the control system the engine may be regulated to meet the emergency condition.

The purpose of partially closing the throttle when the vehicle is not in operation is to alter the characteristics of the engine and the generator so as to avoid charging the battery at a rate sufficiently high to be harmful. When the control arm is in "stop" position the contact segment 6 connects the leads 60 from the resistance 52, thereby short-circuiting the resistance and increasing the current across the brushes of the armature of the watt motor. The torque on the watt motor arm will thereby be greater for the same energy out-put of the generator, with the result that the watt motor arm would be shifted across the rheostat against the tension of its spring 59, and unless the rheostat was of wide range the arm would be shifted through the entire extent of its movement against the stop pin 56 and held there so long as the resistance 52 was cut out, thereby cutting out the automatic control of the generator altogether when the vehicle is stopped. If, however, the resistance 57 has sufficient range, the generator watt output can be reduced in direct proportion to the decrease of resistance of the watt motor armature circuit, when resistance 52 is short-circuited by contact 6. The action of the watt motor regulator is then to hold the generator output constant at this reduced value.

By means of the above described throttle control the power output of the engine for a predetermined speed is reduced to an extent corresponding with the increase in torque of the watt motor represented by the resistance 52, thereby reducing the total generator output such that the greater proportional torque of the watt motor arm when the resistance is cut out makes the actual torque on the watt motor arm the same as when the resistance 52 is in the circuit and the engine is operating to its full capacity. The rheostat 57 thus becomes effective when the generator is operating at its reduced or battery-charging output, and causes the current output of the generator to decrease when the voltage rises as the battery nears full charge, thereby attaining the taper charge effect most desirable for the battery.

I have shown my automatic control system as comprising the ampere hour meter 11 controlling both the starting and stopping of the engine in the manner described above. This mechanism comprises an ampere hour meter of ordinary construction but provided with two sets of contacts, one set closed by the hand of the ampere hour meter when the battery is fully charged, thereby closing the circuit through a coil 80 the energization of which opens the starting switch circuit at 12 and causes the control switches 19, 25 and 27 to open, which brings the engine to stop. When the starting switch is opened by the coil 80 it will be held open by a trip 81 so that the switch will not close when the circuit through the coil is broken by a slight discharge of the battery. The other pair of contacts of the ampere hour meter control is a circuit through a coil 82 which operates the trip 81 to release the trip and allow the switch 12 to close when the battery is discharged a predetermined amount, which may be a third, or a quarter, of its capacity.

It will of course be understood that the contacts 83 and 84 are connected as shown to one side of the battery 10 and that the other contacts are connected through the coils 80 and 82, respectively, to the other side of the battery.

The contacts controlling the coil 82 may be adjustable with reference to the path of movement of the index hand of the ampere hour meter to vary the extent of discharge allowed before the engine is again started.

In the operation of the apparatus the contacts 84 are set to restart the engine after a minor portion only of the current stored in the battery has been utilized. The position of the contacts 84 will be varied to some extent by the service to which the vehicle is put and should be determined so that the engine will be running at all times except when the vehicle is at rest for a substantial period of time. If, for example, the vehicle was running in crowded traffic where there were frequent stops incidental to the traffic, the contacts 84 should be set far enough away from the contacts 83 for the engine to continue in operation during such stops, and thus avoid repeated starting and stopping of the engine. On the other hand, if the vehicle is used under conditions which permit more continuous running the contacts will be set closer together, the intended mode of operation in either case being to operate the vehicle on the battery alone only enough to insure against frequent starting and stopping of the engine.

I claim:

1. In an apparatus of the class described, the combination of an electric operating motor, a prime mover for supplying power thereto, a generator operated by the prime mover, a storage battery, connections between the generator, storage battery, and the electric motor, whereby the storage battery assists in driving the motor, when the load thereon exceeds a predetermined value and is charged by the generator when the load is below such value, a controller for the system for maintaining a practically constant energy output of the generator during both said conditions of operations, a motor controller and means actuated thereby to alter the setting of the generator controller.

2. In an apparatus of the class described, the combination of an electric operating motor, a prime mover for supplying power thereto, a generator operated by the prime mover, a storage battery, connections between the generator, storage battery and the electric motor, whereby the storage battery assists in driving the motor when the load thereon exceeds a predetermined value and is charged by the generator when the load is below such value, a controller for the system for maintaining a practically constant energy output of the generator during both said conditions of operations, a motor controller, and means actuated thereby to alter the setting of the generator controller and engine fuel supply.

3. In an apparatus of the class described, the combination of an electric operating motor, a prime mover for supplying power thereto, a generator operated by the prime mover, a storage battery, connections between the generator, storage battery, and the electric motor, whereby the storage battery assists in driving the motor, when the load thereon exceeds a predetermined value and is charged by the generator when the load is below such value, a controller for the operating motors and independent means actuated by said controller for reducing the generator output.

4. In an apparatus of the class described, the combination of an electric operating motor, a prime mover for supplying power thereto, a generator operated by the prime mover, a storage battery, connections between the generator, storage battery, and the electric motor, whereby the storage battery assists in driving the motor, when the load thereon exceeds a predetermined value and is charged by the generator when the load is below such value, a controller for said operating motors having means for regulating the supply of current to said motors, and means for reducing the output of said generator when said motor controller is actuated to reduce the current to said operating motors to a predetermined extent.

MORTON ARENDT.